(12) United States Patent
Bendyk et al.

(10) Patent No.: US 7,899,944 B2
(45) Date of Patent: Mar. 1, 2011

(54) OPEN EXCHANGE LIMITING IN AN I/O PROCESSING SYSTEM

(75) Inventors: Mark P. Bendyk, Hyde Park, NY (US); Daniel F. Casper, Poughkeepsie, NY (US); John R. Flanagan, Poughkeepsie, NY (US); Roger G. Hathorn, Tucson, AZ (US); Catherine C. Huang, Poughkeepsie, NY (US); Matthew J. Kalos, Tucson, AZ (US); Louis W. Ricci, Hyde Park, NY (US); Gustav E. Sittmann, Webster Groves, MO (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 12/030,967

(22) Filed: Feb. 14, 2008

(65) Prior Publication Data

US 2009/0210579 A1 Aug. 20, 2009

(51) Int. Cl.
*G06F 3/00* (2006.01)
(52) U.S. Cl. ............................... 710/5; 710/16; 710/17; 710/36
(58) Field of Classification Search ....................... None
See application file for complete search history.

(56) References Cited

U.S. PATENT DOCUMENTS

| | | |
|---|---|---|
| 3,943,283 A | 3/1976 | Caragliano et al. |
| 4,004,277 A | 1/1977 | Gavril |
| 4,374,415 A | 2/1983 | Cormier et al. |
| 4,380,046 A | 4/1983 | Frosch et al. |

(Continued)

FOREIGN PATENT DOCUMENTS

DE 3931514 3/1990

(Continued)

OTHER PUBLICATIONS

Brice, et al.; U.S. Appl. No. 11/464,613; "Flexibility Controlling The Transfer Of Data Between Input/Output Devices And Memory"; filed Aug. 15, 2006; Specification having 23 pages and Drawings having 4 sheets.

(Continued)

*Primary Examiner*—Alan Chen
(74) *Attorney, Agent, or Firm*—Cantor Colburn LLP; John Campbell

(57) ABSTRACT

A computer program product, an apparatus, and a method for limiting a number of open exchanges at a channel subsystem of an I/O processing system using data from a control unit. The computer program product includes a tangible storage medium readable by a processing circuit and storing instructions for execution by the processing circuit for performing a method that includes sending a command message to the control unit, and receiving a transport response information unit message in response. The method further includes extracting a maximum control unit exchange parameter from the transport response information unit message, and determining a limit value for a maximum number of open exchanges between the channel subsystem and the control unit as a function of the extracted maximum control unit exchange parameter. The method additionally includes applying the limit value to prevent opening of a new exchange.

25 Claims, 12 Drawing Sheets

U.S. PATENT DOCUMENTS

| | | |
|---|---|---|
| 4,455,605 A | 6/1984 | Cormier et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,866,609 A | 9/1989 | Calta et al. |
| 4,870,566 A | 9/1989 | Cooper et al. |
| 5,016,160 A | 5/1991 | Lambeth et al. |
| 5,031,091 A | 7/1991 | Wakatsuki et al. |
| 5,040,108 A | 8/1991 | Kanazawa |
| 5,386,512 A | 1/1995 | Crisman et al. |
| 5,388,219 A | 2/1995 | Chan et al. |
| 5,410,727 A | 4/1995 | Jaffe et al. |
| 5,434,980 A | 7/1995 | Casper et al. |
| 5,440,729 A | 8/1995 | Kimura et al. |
| 5,461,721 A | 10/1995 | Cormier et al. |
| 5,465,359 A | 11/1995 | Allen et al. |
| 5,500,942 A | 3/1996 | Eickemeyer et al. |
| 5,526,484 A | 6/1996 | Casper et al. |
| 5,539,918 A | 7/1996 | Allen et al. |
| 5,546,533 A | 8/1996 | Koyama |
| 5,584,039 A | 12/1996 | Johnson et al. |
| 5,600,793 A | 2/1997 | Nord |
| 5,613,163 A | 3/1997 | Marron et al. |
| 5,640,600 A | 6/1997 | Satoh et al. |
| 5,758,190 A | 5/1998 | Johnson et al. |
| 5,768,620 A | 6/1998 | Johnson et al. |
| 5,831,985 A | 11/1998 | Sandorfi |
| 5,860,022 A | 1/1999 | Kondou et al. |
| 5,894,583 A | 4/1999 | Johnson et al. |
| 5,901,327 A | 5/1999 | Ofek |
| 6,230,218 B1 | 5/2001 | Casper et al. |
| 6,343,335 B1 | 1/2002 | Dahman et al. |
| 6,353,612 B1 | 3/2002 | Zhu et al. |
| 6,484,217 B1 | 11/2002 | Fuente et al. |
| 6,609,161 B1 | 8/2003 | Young |
| 6,647,016 B1 | 11/2003 | Isoda et al. |
| 6,651,125 B2 | 11/2003 | Maergner et al. |
| 6,658,603 B1 | 12/2003 | Ward |
| 6,693,880 B2 | 2/2004 | Gregg et al. |
| 6,694,390 B1 | 2/2004 | Bogin et al. |
| 6,772,207 B1 | 8/2004 | Dorn et al. |
| 6,826,661 B2 | 11/2004 | Umbehocker et al. |
| 6,862,322 B1 | 3/2005 | Ewen et al. |
| 6,898,202 B2 | 5/2005 | Gallagher et al. |
| 6,915,378 B2 | 7/2005 | Roberti |
| 7,000,036 B2 | 2/2006 | Carlson et al. |
| 7,003,700 B2 | 2/2006 | Elko et al. |
| 7,020,810 B2 | 3/2006 | Holman |
| 7,035,540 B2 | 4/2006 | Finan et al. |
| 7,100,096 B2 | 8/2006 | Webb, Jr. et al. |
| 7,111,130 B2 | 9/2006 | Blake et al. |
| 7,124,207 B1 | 10/2006 | Lee et al. |
| 7,202,801 B2 | 4/2007 | Chou |
| 7,277,387 B2 | 10/2007 | Sanders et al. |
| 7,382,733 B2 | 6/2008 | Banerjee et al. |
| 7,484,021 B2 | 1/2009 | Rastogi et al. |
| 7,500,030 B2 | 3/2009 | Hathorn et al. |
| 7,539,777 B1 | 5/2009 | Aitken |
| 7,555,554 B2 | 6/2009 | Manders et al. |
| 7,564,791 B2 | 7/2009 | Jayakrishnan et al. |
| 7,599,360 B2 | 10/2009 | Edsall et al. |
| 7,711,871 B1 | 5/2010 | Haechten et al. |
| 2001/0030943 A1 | 10/2001 | Gregg et al. |
| 2002/0062407 A1 | 5/2002 | Tateyama et al. |
| 2002/0099967 A1 | 7/2002 | Kawaguchi |
| 2002/0152338 A1 | 10/2002 | Elliott et al. |
| 2002/0178404 A1 | 11/2002 | Austen et al. |
| 2003/0084213 A1 | 5/2003 | Brice, Jr. et al. |
| 2003/0158998 A1 | 8/2003 | Smith |
| 2003/0188053 A1 | 10/2003 | Tsai |
| 2004/0054776 A1* | 3/2004 | Klotz et al. ............... 709/224 |
| 2004/0113772 A1 | 6/2004 | Hong Chou |
| 2004/0136241 A1 | 7/2004 | Rapp et al. |
| 2004/0151160 A1 | 8/2004 | Sanders et al. |
| 2004/0193968 A1 | 9/2004 | Dugan et al. |
| 2004/0210719 A1 | 10/2004 | Bushey et al. |
| 2004/0260851 A1 | 12/2004 | Tu |
| 2005/0018673 A1 | 1/2005 | Dropps et al. |
| 2005/0102456 A1 | 5/2005 | Kang |
| 2005/0105456 A1 | 5/2005 | Cookson et al. |
| 2005/0108251 A1 | 5/2005 | Hunt |
| 2005/0175341 A1 | 8/2005 | Ovadia |
| 2005/0204069 A1 | 9/2005 | Carlson et al. |
| 2005/0223291 A1 | 10/2005 | Zimmer et al. |
| 2005/0257118 A1 | 11/2005 | Shien |
| 2006/0036769 A1 | 2/2006 | Frey et al. |
| 2006/0050726 A1 | 3/2006 | Ahmed et al. |
| 2006/0085595 A1 | 4/2006 | Slater |
| 2006/0159112 A1 | 7/2006 | Sundaram et al. |
| 2006/0224795 A1 | 10/2006 | Muto et al. |
| 2007/0016554 A1 | 1/2007 | Dapp et al. |
| 2007/0061463 A1 | 3/2007 | Hiramatsu et al. |
| 2007/0072579 A1 | 3/2007 | Paila et al. |
| 2007/0079051 A1 | 4/2007 | Tanaka et al. |
| 2007/0174544 A1 | 7/2007 | Yasuda et al. |
| 2007/0239944 A1 | 10/2007 | Rupanagunta et al. |
| 2007/0294697 A1 | 12/2007 | Theimer et al. |
| 2008/0040519 A1 | 2/2008 | Starr et al. |
| 2008/0147890 A1 | 6/2008 | Casper et al. |
| 2008/0183877 A1 | 7/2008 | Carlson et al. |
| 2008/0235553 A1 | 9/2008 | Chintada |
| 2008/0256264 A1 | 10/2008 | Muto et al. |
| 2008/0273518 A1 | 11/2008 | Pratt |
| 2009/0055585 A1 | 2/2009 | Fernandes et al. |
| 2009/0144586 A1 | 6/2009 | Casper et al. |
| 2009/0172203 A1 | 7/2009 | Casper et al. |
| 2009/0210557 A1 | 8/2009 | Gainey, Jr. et al. |
| 2009/0210559 A1 | 8/2009 | Flanagan et al. |
| 2009/0210560 A1 | 8/2009 | Yudenfriend et al. |
| 2009/0210561 A1 | 8/2009 | Ricci et al. |
| 2009/0210562 A1 | 8/2009 | Huang et al. |
| 2009/0210563 A1 | 8/2009 | Flanagan et al. |
| 2009/0210564 A1 | 8/2009 | Ricci et al. |
| 2009/0210570 A1 | 8/2009 | Bendyk et al. |
| 2009/0210571 A1 | 8/2009 | Casper et al. |
| 2009/0210572 A1 | 8/2009 | Yudenfriend et al. |
| 2009/0210573 A1 | 8/2009 | Yudenfriend et al. |
| 2009/0210576 A1 | 8/2009 | Casper et al. |
| 2009/0210580 A1 | 8/2009 | Bendyk et al. |
| 2009/0210581 A1 | 8/2009 | Flanagan et al. |
| 2009/0210582 A1 | 8/2009 | Bendyk et al. |
| 2009/0210583 A1 | 8/2009 | Bendyk et al. |
| 2009/0210584 A1 | 8/2009 | Carlson et al. |
| 2009/0210585 A1 | 8/2009 | Ricci et al. |
| 2009/0210768 A1 | 8/2009 | Carlson et al. |
| 2009/0210769 A1 | 8/2009 | Casper et al. |
| 2009/0210884 A1 | 8/2009 | Ricci et al. |

FOREIGN PATENT DOCUMENTS

| | | |
|---|---|---|
| GB | 1264096 | 2/1972 |
| GB | 2291990 | 2/1996 |
| JP | 63236152 | 10/1988 |
| WO | WO2006102664 A2 | 9/2006 |

OTHER PUBLICATIONS

Casper, et al.; U.S. Appl. No. 11/548,060; "Facilitating Input/Output Processing by Using Transport Control Words to Reduce Input/Output Communications"; filed Oct. 16, 2006; Specification having 32 pages and Drawings having 12 sheets.

Casper, et al.; U.S. Appl. No. 11/548,093; "Facilitating Access To Status And Measurement Data Associated With Input/Output Processing"; filed Oct. 16, 2006; Specification having 33 pages and Drawings having 12 sheets.

Dauby, et al. "Contention Resolution Between Two Processors"; IBM Technical Disclosure Bulletin; vol. 26; No. 10A; Mar. 1984; 3 pages.

DeVeer, J.A.; "Control Frame Multiplexing On Serial I/O Channels"; IBM Technical Disclosure Bulletin; vol. 32; No. 10A; Mar. 1990; pp. 39-40.

Golasky, Richard; "Link-Level Error Recovery With Tape Backup"; Dell Power Solutions; Aug. 2005; pp. 88-91.

"IBM® z/Architecture Principles of Operation", Publication No. SA22-7832-05, 6th Edition, Apr. 2007. 1,215 pages separated into 4 electronic attachments.

Peterson, David; "Information Technology, Fibre Channel Protocol for SCSI, Fourth Version (FCP-3)", Draft Proposed American National Standard, Jun. 2004; pp. 1-142.

Snively, et al.; "Fibre Channel Single Byte Command Code Sets-3 Mapping Protocol (FC-SB-3)"; T11/Project 1357-D/Rev. 1.6, INCITS; Mar. 2003; pp. 1-206.

Snively, et al.; "Fibre Channel, Framing and Signaling"; (FC-FS) Rev. 1.70; NCITS Working Draft Proposed American National Standard for Information Technology; Feb. 2002; pp. i-575.

Written Opinion and International Search Report for PCT/EP2009/051445 dated Jun. 25, 2009.

Written Opinion and International Search Report for PCT/EP2009/051446 dated Jun. 25, 2009.

Written Opinion and International Search Report for PCT/EP2009/051462 dated Jul. 1, 2009.

Written Opinion and International Search Report for PCT/EP2009/051450 dated Jul. 7, 2009.

Written Opinion and International Search Report for PCT/EP2009/051459 dated Jun. 23, 2009.

Written Opinion and International Search Report for PCT/EP2009/051463 dated Jul. 22, 2009.

"Information Technology-Fibre Channel Protocol for SCSI, Third Version (FCP-3)," T10 Project 1560-D, Revision 4g, Sep. 13, 2005.

U.S. Appl. No. 12/031,038 Non-Final Office Action dated Nov. 16, 2009.

U.S. Appl. No. 12/030,975 Non-Final Office Action dated Oct. 22, 2009.

U.S. Appl. No. 12/030,932 Non-Final Office Action dated Dec. 16, 2009.

U.S. Appl. No. 12/031,023 Non-Final Office Action dated Oct. 29, 2009.

U.S. Appl. No. 12/030,951 Non-Final Office Action dated Nov. 23, 2009.

U.S. Appl. No. 12/030,961 Non-Final Office Action dated Dec. 17, 2009.

U.S. Appl. No. 12/030,939 Non-Final Office Action dated Nov. 16, 2009.

U.S. Appl. No. 12/030,989 Non-Final Office Action dated Oct. 22, 2009.

U.S. Appl. No. 12/030,993 Non-Final Office Action dated Oct. 28, 2009.

U.S. Appl. No. 12/031,021 Non-Final Office Action dated Jan. 8, 2010.

U.S. Appl. No. 12/181,662—Non-Final Office Action dated Jun. 18, 2009.

U.S. Appl. No. 12/181,662—Final Office Action dated Jan. 4, 2010.

Iren, et al.; "The Transport Layer: Tutorial and Survey"; ACM Computing Surveys; vol. 31, No. 4; Dec. 1999; pp. 360-405.

International Search Report and Written Opinion for PCT/EP2009/051447 dated Jul. 1, 2009.

International Search Report and Written Opinion for PCT/EP2009/051483 dated Jul. 27, 2009.

Nordstrom.; "Sequence Reception Method for a Fibre Channel Protocol Chip"; IBM Technical Disclosure Bulletin; vol. 38, No. 12; Dec. 1995; pp. 267-269.

U.S. Appl. No. 11/548,060 Non-Final Office Action dated Apr. 15, 2008.

U.S. Appl. No. 11/548,093 Non-Final Office Action dated Apr. 17, 2008.

"Protocol for Insochronous Traffic Over Fiber Channel Switching"; IBM Technical Disclosure Bulletin; vol. 37, No. 06B; Jun. 1994. pp. 377-380.

Sachs, M.W.; "I/O Marker Changing"; IBM Technical Disclosure Bulletin; vol. 37, No. 02A; Feb. 1994; pp. 75-76.

Simmons et al.; "A Performance Comparison Of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.

Srikrishnan et al.; "Sharing FCP Adapters Through Virtualization"; IBM J. Res. & Dev., vol. 51, No. 1/2; Jan./Mar. 2007; pp. 103-118.

Stone, et al.; "When the CRC and TCP Checksum Disagree"; SIGCOMM '00, Stockholm, Sweden; Jul. 2000; 10 pages.

U.S. Appl. No. 12/183,315, filed Jul. 31, 2008.

U.S. Appl. No. 12/183,323, filed Jul. 31, 2008.

U.S. Appl. No. 12/183,305, filed Jul. 31, 2008.

"z/Architecture-Principles of Operation," IBM Publication No. SA22-7832-04, 5th Ed., Sep. 2005.

U.S. Appl. No. 12/030,912 Non-Final Office Action dated Mar. 18, 2010.

U.S. Appl. No. 12/030,920 Non-Final Office Action dated Feb. 23, 2010.

U.S. Appl. No. 12/030,954 Non-Final Office Action dated Jan. 21, 2010.

Written Opinion and International Search Report for PCT/EP2009/051461 dated Sep. 22, 2009.

U.S. Appl. No. 12/031,182 Non-Final Office Action dated Jan. 22, 2010.

U.S. Appl. No. 12/031,201 Non-Final Office Action dated Jan. 25, 2010.

International Search Report; International Application No. PCT/EP2009/059184; International Filing Date: Jul. 16, 2009; Date of mailing: Jan. 14, 2010; 9 pages.

U.S. Appl. No. 12/030,967 Restriction Requirement Mailed Dec. 29, 2009.

Ansi Incits 433-2007, Information Technology Fibre Channel Link Services (FC-LS), Jul. 2007.

Fibre Channel Single Byte Command Code Sets-2 Mapping Protocol (FC-SB-3), T11/Project 1357-D/Rev 1.6, INCITS Mar. 2003.

U.S. Appl. No. 12/030,951 Non-Final Office Action dated May 20, 2010.

U.S. Appl. No. 12/031,038, Non-Final Office Action Mailed Apr. 15, 2010.

U.S. Appl. No. 12/030,975. Final Office Action Mailed May 13, 2010.

U.S. Appl. No. 12/030,985, Non Final Office Action Mailed May 5, 2010.

U.S. Appl. No. 12/031,042, Non-Final Office Action Mailed Apr. 5, 2010.

U.S. Appl. No. 12/031,021, Notice of Allowance Mailed Apr. 30, 2010.

U.S. Appl. No. 12/183,305, Non-Final Office Action Mailed May 11, 2010.

U.S. Appl. No. 12/183,315 Notice of Allowance dated Jun. 15, 2010.

U.S. Appl. No. 12/030,989 Final Office Action dated May 24, 2010.

SCSI Primary Commands - 4 (SPC-4); Project T10/1731-D. Rev 11. INCITS Apr. 14, 2010.

U.S. Appl. No. 12/030,939 Notice of Alllowance mailed Jun. 29, 2010.

U.S. Appl. No. 12/030,954 Non Final Office Action mailed Jul. 12, 2010.

U.S. Appl. No. 12/030,961 Final Office Action mailed Jul. 12, 2010.

U.S. Appl. No. 12/030,993 Non Final Office Action mailed Jun. 28, 2010.

U.S. Appl. No. 12/031,021 Notice of Allowance mailed Jul. 8, 2010.

U.S. Appl. No. 12/031,023 Non Final Office Action mailed Jun. 11, 2010.

U.S. Appl. No. 12/183,323 Non Final Office Action mailed Jul. 19, 2010.

U.S. Appl. No. 12/392,246 Notice of Allowance mailed Jul. 15, 2010.

* cited by examiner

| DEFINITION | | WORD | BYTE 0 | 1 | 2 | 3 |
|---|---|---|---|---|---|---|
| STATUS 902 | | 00 | ADDRESS HEADER 906 | | | |
| | | 01 | | | | |
| | | 02 | STATUS FLAGS 1 908 | MAX CU EXCHANGE PARAMETER 910 | RESPONSE FLAGS 912 | RESPONSE CODE 914 |
| | | 03 | | | RESIDUAL COUNT 916 | |
| | | 04 | | | RESPONSE LENGTH 918 | |
| | | 05 | | | RESERVED 920 | |
| | | 06 | SPC-4 SENSE TYPE 922 | STATUS FLAGS 2 924 | STATUS FLAGS 3 926 | DEVICE STATUS 928 |
| | | 07 | LRC ON WORDS 0 TO 6 ABOVE 930 | | | |
| EXTENDED STATUS 904 | TSH 932 | 08 | ES LENGTH 940 | ES FLAGS 942 | DCW OFFSET 944 | |
| | | 09 | | | DCW RESIDUAL COUNT 946 | |
| | | 10 | | | RESERVED 948 | |
| | TSA 934 | 11 | TOTAL DEVICE TIME PARAMETER 950 | | | |
| | | 12 | DEFER TIME PARAMETER 952 | | | |
| | | 13 | QUEUE TIME PARAMETER 954 | | | |
| | | 14 | DEVICE BUSY TIME PARAMETER 956 | | | |
| | | 15 | DEVICE ACTIVE ONLY TIME PARAMETER 958 | | | |
| | | 15 + N | UP TO 8 WORDS OF APPENDED DEVICE SENSE DATA 960 | | | |
| | LRC 936 | 15 + N +1 | LRC ON WORD 08 to 15 + N | | | |

FIG. 9

OPEN EXCHANGE LIMITING IN AN I/O PROCESSING SYSTEM

BACKGROUND OF THE INVENTION

1. Field of the Invention

The present disclosure relates generally to input/output processing, and in particular, to limiting a number of open exchanges in an input/output processing system.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices. Exchanges are opened between the channel subsystem and the control unit to manage the flow of messages over the channel paths.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entity. Further, the channel infers certain information associated with processing the response from the control unit for each command.

Performing I/O processing on a per CCW basis may involve a large amount of processing overhead for the channel subsystem, as the channels parse CCWs, track state information, and react to responses from the control units. Therefore, it may be beneficial to shift much of the processing burden associated with interpreting and managing CCW and state information from the channel subsystem to the control units. Simplifying the role of channels in communicating between the control units and an operating system in the I/O processing system may increase communication throughput as less handshaking is performed. Since different control units may support a variable number of open communication exchanges between control units and the channel subsystem, it would also be beneficial to provide information indicating the maximum number of open exchanges supported by the control unit to the channel subsystem. Supporting a variable number of open exchanges beyond a static limit for all control units would enable support of numerous control units of varying levels of complexity. Moreover, enforcing limits on the number of open exchanges at the channel subsystem could prevent error conditions at the control units attributable to attempting to open too many exchanges, which may further enhance communication throughput. Accordingly, there is a need in the art for limiting the number of open exchanges in an I/O processing system.

BRIEF SUMMARY OF THE INVENTION

Embodiments of the invention include a computer program product for limiting a number of open exchanges at a channel subsystem of an input/output (I/O) processing system using data from a control unit. The computer program product includes a tangible storage medium readable by a processing circuit and storing instructions for execution by the processing circuit for performing a method. The method includes sending a command message to the control unit, and receiving a transport response information unit message at the channel subsystem in response to sending the command message to the control unit. The method further includes extracting a maximum control unit exchange parameter from the transport response information unit message as populated by the control unit, and determining a limit value for a maximum number of open exchanges between the channel subsystem and the control unit at the channel subsystem as a function of the extracted maximum control unit exchange parameter. The method additionally includes applying the limit value to prevent opening of a new exchange.

Additional embodiments include an apparatus for limiting a number of open exchanges at a channel subsystem of an I/O processing system. The apparatus includes a channel subsystem in communication with a control unit. The channel subsystem performs a method that includes sending a command message to the control unit, receiving a transport response information unit message at the channel subsystem in response to sending the command message to the control unit, and extracting a maximum control unit exchange parameter from the transport response information unit message as populated by the control unit. The method also includes determining a limit value for a maximum number of open exchanges between the channel subsystem and the control unit at the channel subsystem as a function of the extracted maximum control unit exchange parameter, and applying the limit value to prevent opening of a new exchange.

Further embodiments include a method for limiting a number of open exchanges at a channel subsystem of an I/O processing system using data from a control unit. The method includes sending a command message to the control unit, receiving a transport response information unit message at the channel subsystem in response to sending the command message to the control unit, and extracting a maximum control unit exchange parameter from the transport response information unit message as populated by the control unit. The method further includes determining a limit value for a maximum number of open exchanges between the channel subsystem and the control unit at the channel subsystem as a function of the extracted maximum control unit exchange parameter, and applying the limit value to prevent opening of a new exchange.

An additional embodiment includes a computer program product for limiting a number of open exchanges at a channel subsystem of an I/O processing system using data from a control unit. The computer program product includes a tangible storage medium readable by a processing circuit and storing instructions for execution by the processing circuit for performing a method. The method includes sending a transport command information unit message to the control unit including a transport command control block (TCCB) as part of a transport control word (TCW) channel program, and setting a limit value equal to a default value until a transport response information unit message is received from the control unit. The limit value establishes a maximum number of open exchanges between the channel subsystem and the control unit at the channel subsystem. The method further includes receiving the transport response information unit message at the channel subsystem in response to sending the transport command information unit message to the control unit, and extracting a maximum control unit exchange parameter from the transport response information unit message as populated by the control unit. The method additionally includes determining the limit value as a function of the extracted maximum control unit exchange parameter, where the limit value is unmodified in response to the extracted maximum control unit exchange parameter with a value of zero. The method also includes applying the limit value to prevent opening of a new exchange to block a new I/O command from being output on the new exchange in response to a current number of open exchanges being greater than or equal to the limit value.

A further embodiment includes an apparatus for limiting a number of open exchanges at a channel subsystem of an I/O processing system. The apparatus includes a channel subsystem in communication with a control unit. The channel subsystem performs a method that includes sending a transport command information unit message to the control unit including a TCCB as part of a TCW channel program, and setting a limit value equal to a default value until a transport response information unit message is received from the control unit. The limit value establishes a maximum number of open exchanges between the channel subsystem and the control unit at the channel subsystem. The method also includes receiving the transport response information unit message at the channel subsystem in response to sending the transport command information unit message to the control unit, and extracting a maximum control unit exchange parameter from the transport response information unit message as populated by the control unit. The method further includes determining the limit value as a function of the extracted maximum control unit exchange parameter, where the limit value is unmodified in response to the extracted maximum control unit exchange parameter with a value of zero. The method additionally includes applying the limit value to prevent opening of a new exchange to block a new I/O command from being output on the new exchange in response to a current number of open exchanges being greater than or equal to the limit value.

Other computer program products, apparatuses, and/or methods according to embodiments will be or become apparent to one with skill in the art upon review of the following drawings and detailed description. It is intended that all such additional computer program products, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 9 depicts one embodiment of a response message communicated from a control unit to a channel, in accordance with an aspect of the present invention;

Figure 1:
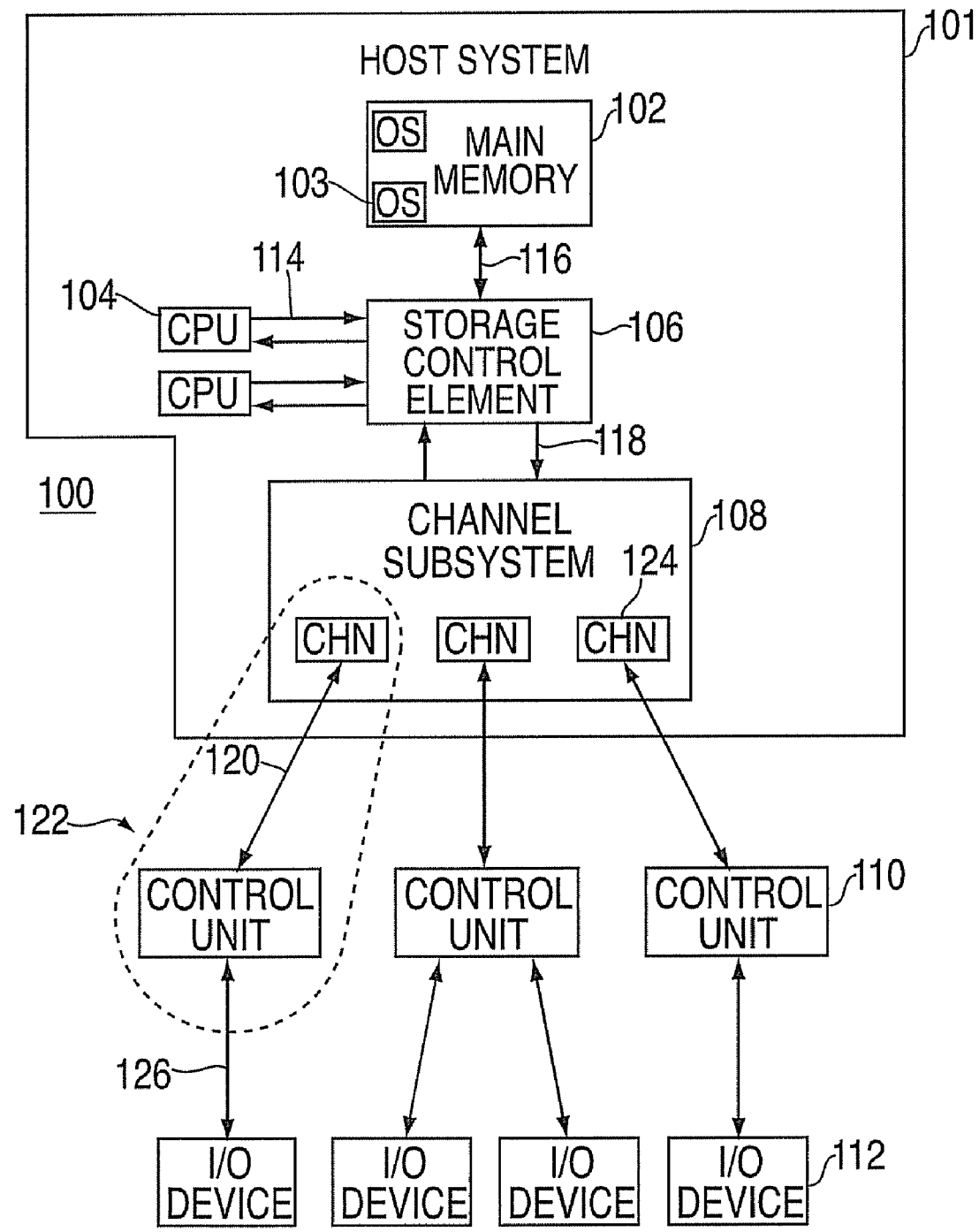
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION OF THE INVENTION

In accordance with an aspect of the present invention, input/output (I/O) processing is facilitated. For instance, I/O processing is facilitated by readily enabling access to information, such as status and measurement data, associated with I/O processing. Further, I/O processing is facilitated, in one example, by reducing communications between components of an I/O processing system used to perform the I/O processing. For instance, the number of exchanges and sequences between an I/O communications adapter, such as a channel, and a control unit is reduced. This is accomplished by sending a plurality of commands from the I/O communications adapter to the control unit as a single entity for execution by the control unit, and by the control unit sending the data resulting from the commands, if any, as a single entity.

The plurality of commands are included in a block, referred to herein as a transport command control block (TCCB), an address of which is specified in a transport control word (TCW). The TCW is sent from an operating system or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

In an exemplary embodiment, the control unit generates a response message including status and extended status information in response to executing the channel program. The control unit may also generate a response message without executing the channel program under a limited number of communication scenarios, e.g., to inform the I/O communications adapter that the channel program will not be executed. The control unit may include a number of elements to support communication between the I/O communications adapter and I/O devices, as well as in support of channel program execution. For example, the control unit can include control logic to parse and process messages, in addition to one or more queues, timers, and registers to facilitate communication and status monitoring. The I/O communications adapter parses the response message, extracting the status and extended status information, and performs further operations using the extracted information, such as limiting the number of open exchanges between the I/O communications adapter and the control unit.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented as an optical link, employing single-mode or multi-mode waveguides in a Fibre Channel fabric. Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unlit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2A:
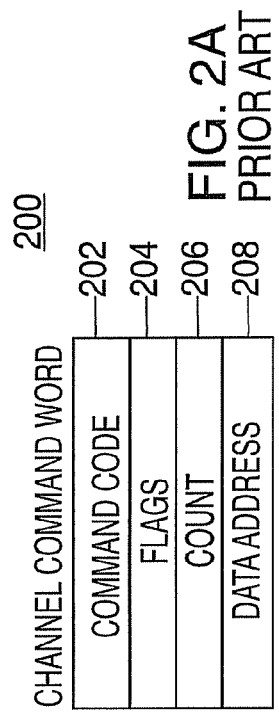
FIG. 2a depicts one example of a prior art channel command word.

In one embodiment, to transfer data between I/O devices 112 and memory 102, channel command words (CCWs) are used. A CCW specifies the command to be executed, and includes other fields to control processing. One example of a CCW is described with reference to FIG. 2a. A CCW 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for instance, an operating system, or other software. The software sets up the CCWs and obtains the addresses of memory assigned to the channel program. An example of a CCW channel program is described with reference to FIG. 2b. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more read CCWs 221. Each read CCW 220 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

The processing of a CCW channel program is described with reference to FIG. 3, as well as with reference to FIG. 2b. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2b) and the data is obtained from define extent data area 216. The channel 300 uses TIC 218 to locate the locate record CCW and the read CCW. It fetches the locate record command 305 (FIG. 3) from the locate record CCW 217 (FIG. 2b) and obtains the data from locate record data 220. The read command 306 (FIG. 3) is fetched from read CCW 221 (FIG. 2b). Each is sent to the control unit 302.

The control unit 302 opens an exchange 308 with the channel 300, in response to the open exchange of the channel 300. This can occur before or after locate command 305 and/or read command 306. Along with the open exchange, a response (CMR) is forwarded to the channel 300. The CMR provides an indication to the channel 300 that the control unit 302 is active and operating.

The control unit 302 sends the requested data 310 to the channel 300. Additionally, the control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to read 4 k of data requires two exchanges to be opened and closed and seven sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel and is not sent or seen by the control unit.

One example of a channel program to read 4 k of data, as in FIG. 2b, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transfer mode indirect data address words (TIDAWs), similar to MIDAWs) that points to data area 406, and a status area 408. TCWs, TCCBs, and status are described in further detail below.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety.

Figure 5:
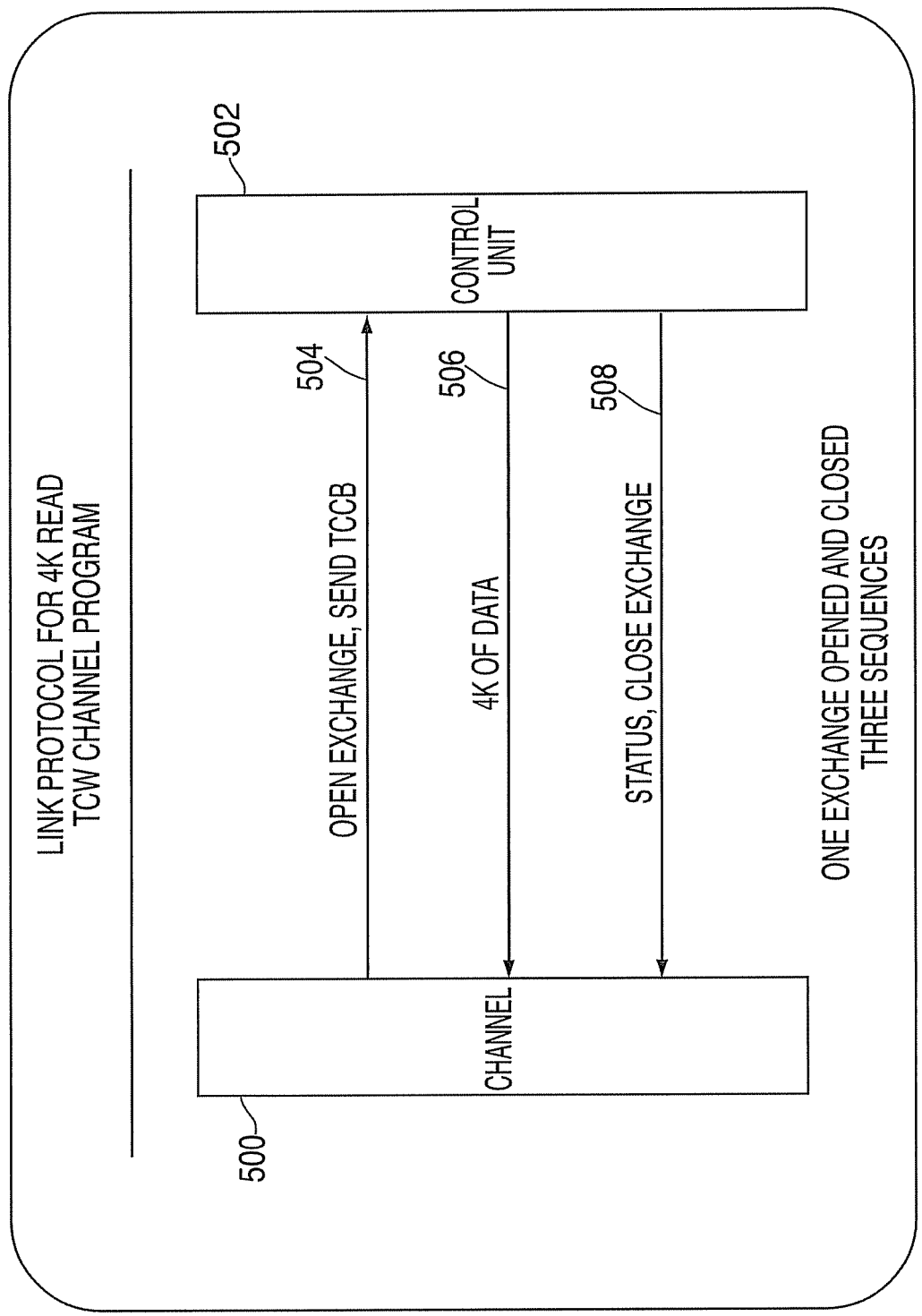
FIG. 5 depicts one embodiment of a link protocol used to communicate between a channel and control unit to execute the transport control word channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 executes the multiple commands of the TCCB 504 (e.g., define extent command, locate record command, read command as device control words (DCWs)) and forwards data 506 to the channel 500 via, for instance, a FCP_Data IU. It also provides status and closes the exchange 508. As one example, final status is sent in a FCP status frame that has a bit active in, for instance, byte 10 or 11 of the payload of a FCP_RSP IU, also referred to as a transport response IU. The FCP_RSP IU payload may be used to transport FICON ending status along with additional status information, including parameters that support the calculation of extended measurement words and notify the channel 500 of the maximum number of open exchanges supported by the control unit 502.

In a further example, to write 4 k of customer data, the channel 500 uses the FCP link protocol phases, as follows:
1. Transfer a TCCB in the FCP_CMND IU.
2. Transfer the IU of data, and sequence initiative to the control unit 502.

3. Final status is sent in a FCP status frame that has a bit active in, for instance, byte 10 or 11 of the FCP_RSP IU Payload. The FCP_RSP_INFO field or sense field is used to transport FICON ending status along with additional status information, including parameters that support the calculation of extended measurement words and notify the channel 500 of the maximum number of open exchanges supported by the control unit 502.

Figure 2B:
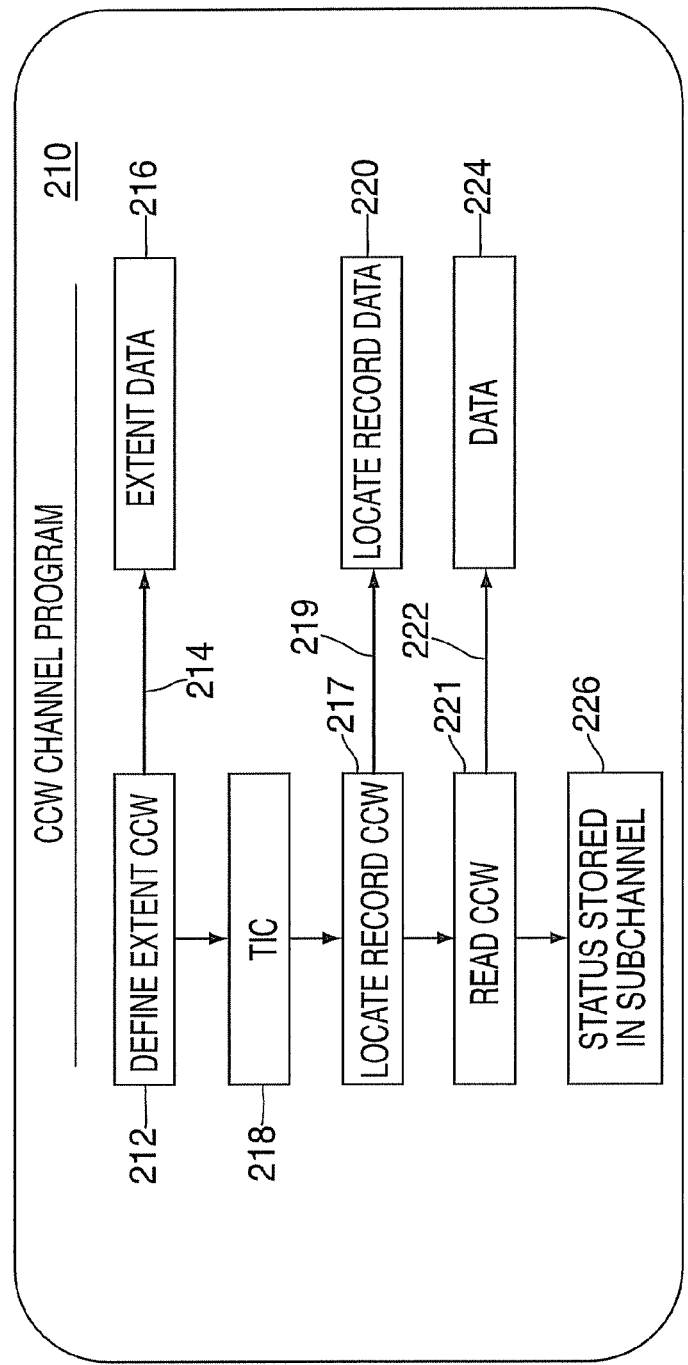
FIG. 2b depicts one example of a prior art channel command word channel program.
Figure 3:
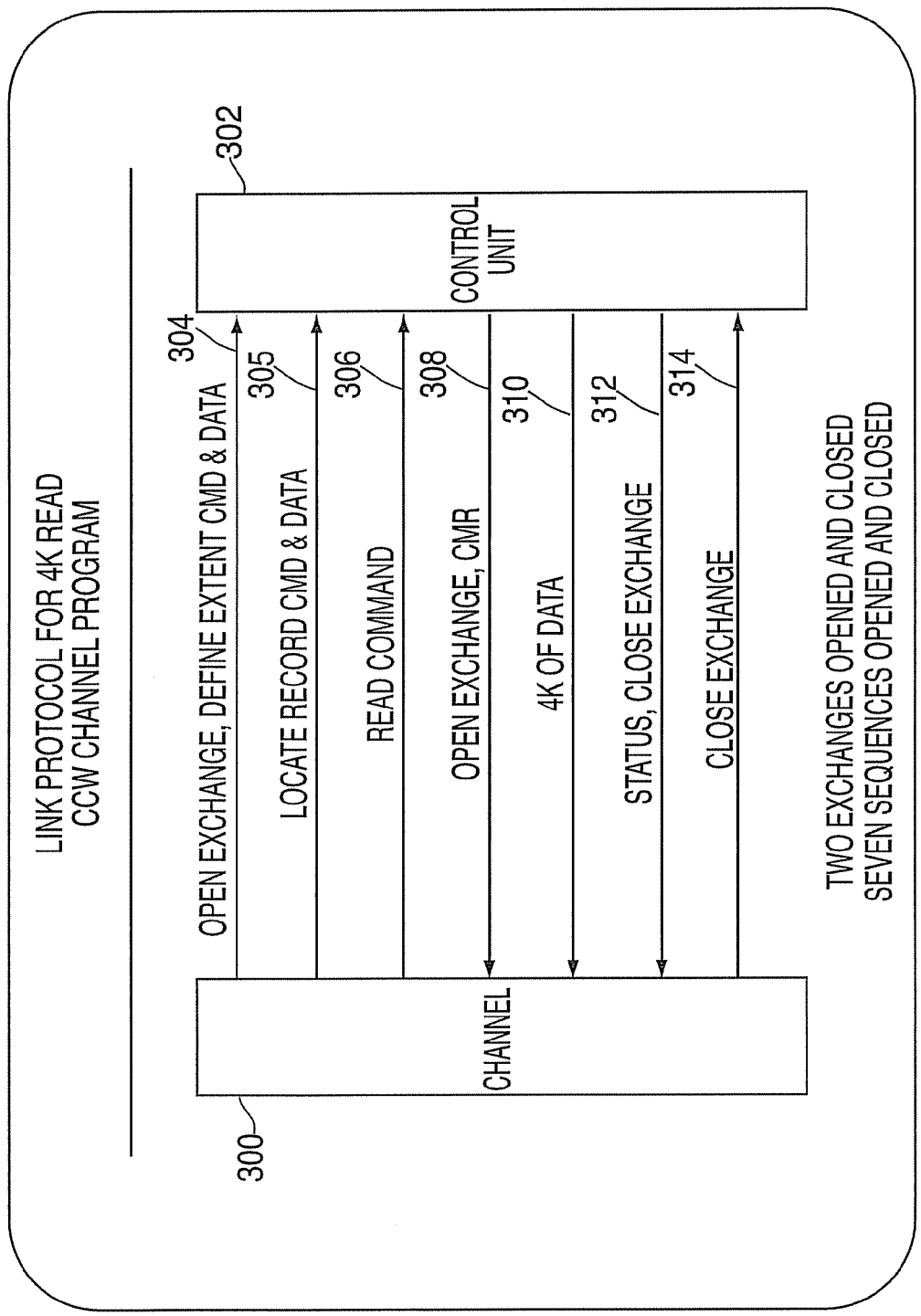
FIG. 3 depicts one embodiment of a prior art link protocol used in communicating between a channel and control unit to execute the channel command word channel program of FIG. 2b.
Figure 4:
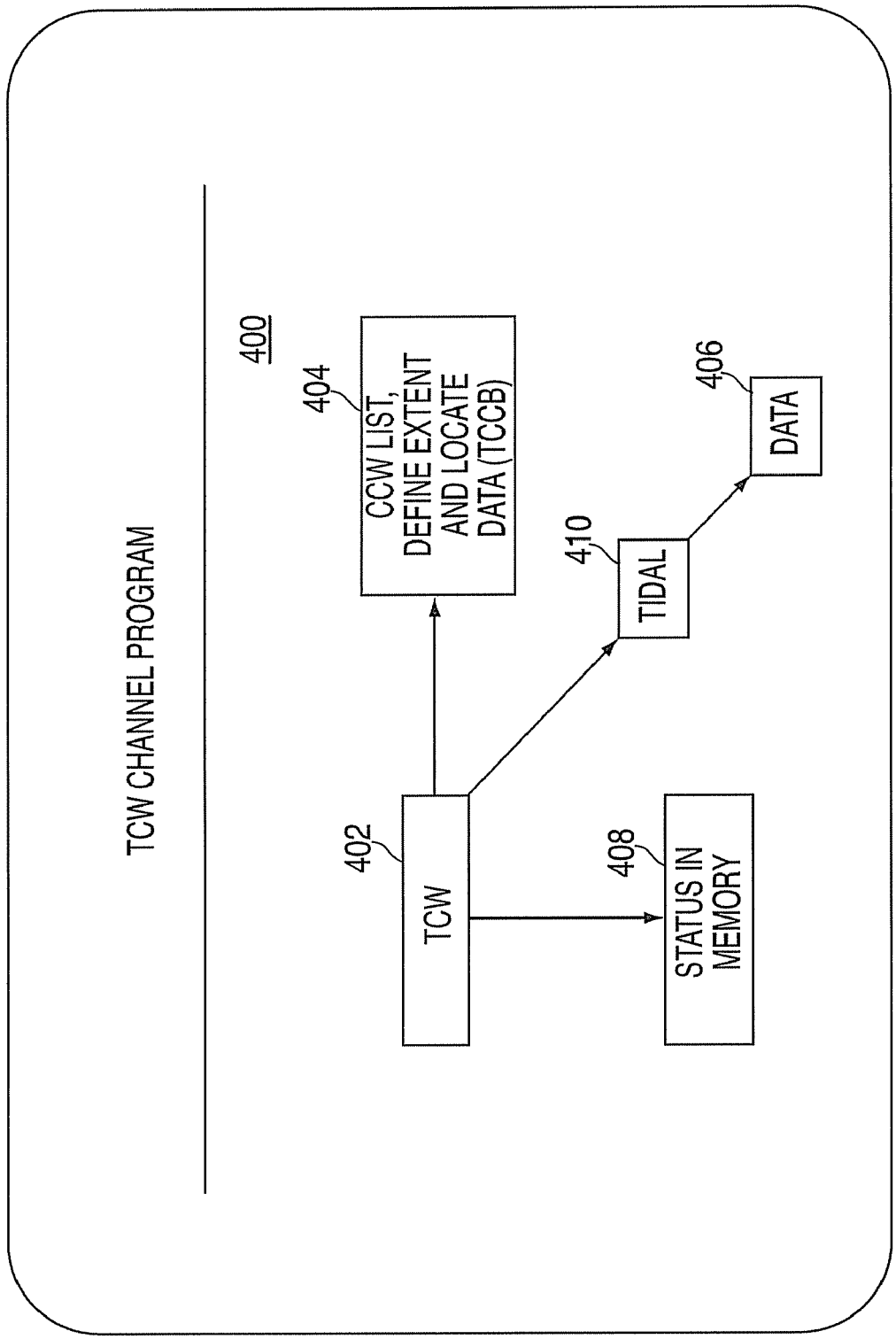
FIG. 4 depicts one embodiment of a transport control word channel program, in accordance with an aspect of the present invention.

By executing the TCW channel program of FIG. 4, there is only one exchange opened and closed (see also FIG. 5), instead of two exchanges for the CCW channel program of FIG. 2b (see also FIG. 3). Further, for the TCW channel program, there are three communication sequences (see FIGS. 4-5), as compared to seven sequences for the CCW channel program (see FIGS. 2b-3).

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command 600, locate record command 601, read command 602, read command 604, read command 606, locate record command 607 and read command 608) are sent in separate sequences from channel 610 to control unit 612. Further, each 4 k block of data (e.g., data 614-620) is sent in separate sequences from the control unit 612 to the channel 610. This CCW channel program requires two exchanges to be opened and closed (e.g., open exchanges 622, 624 and close exchanges 626, 628), and fourteen communications sequences. This is compared to the three sequences and one exchange for the TCW channel program of FIG. 7, which accomplishes the same task as the CCW channel program of FIG. 6.

Figure 6:
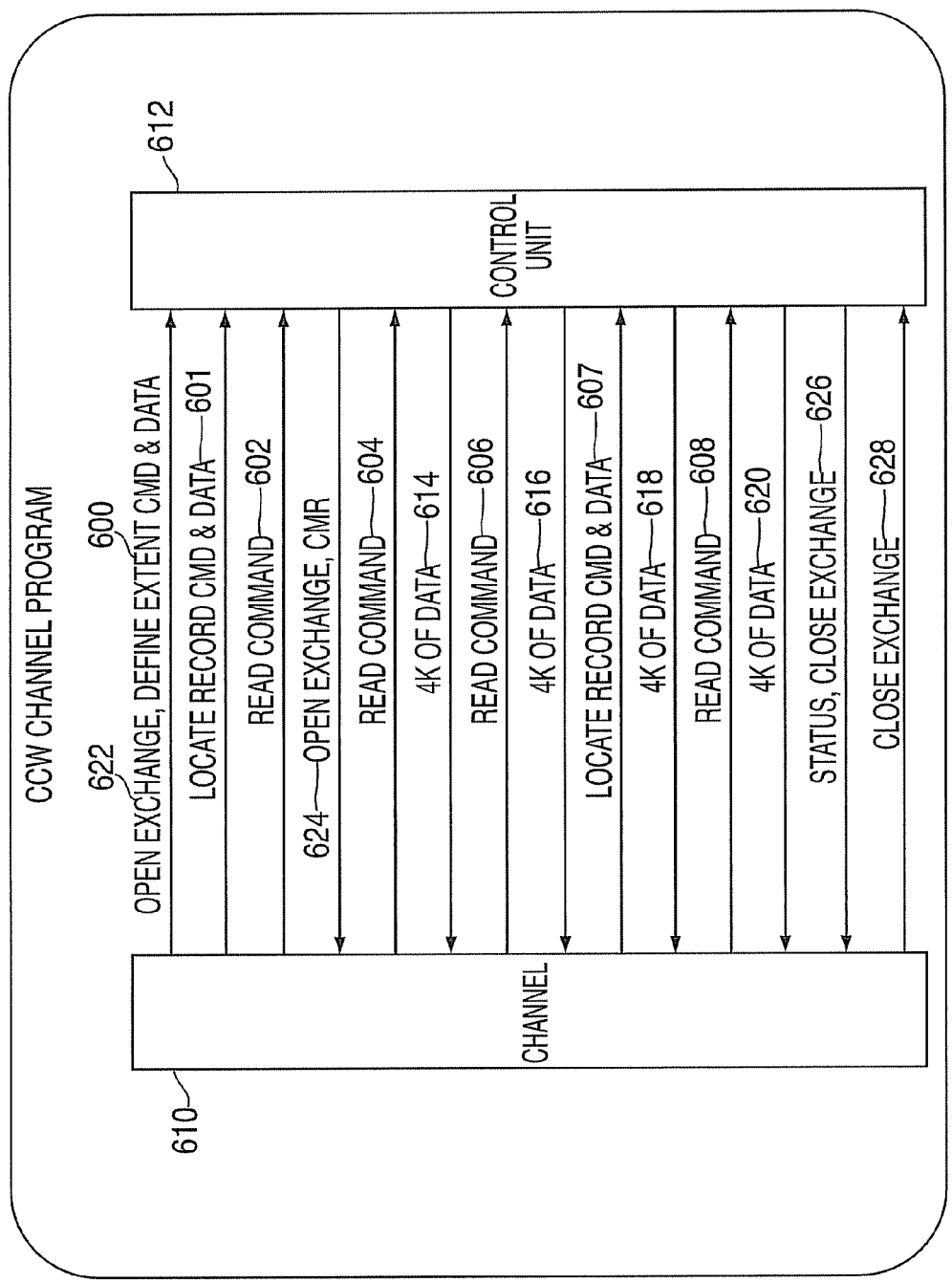
FIG. 6 depicts one embodiment of a prior art link protocol used to communicate between a channel and control unit in order to execute four read commands of a channel command word channel program.
Figure 7:
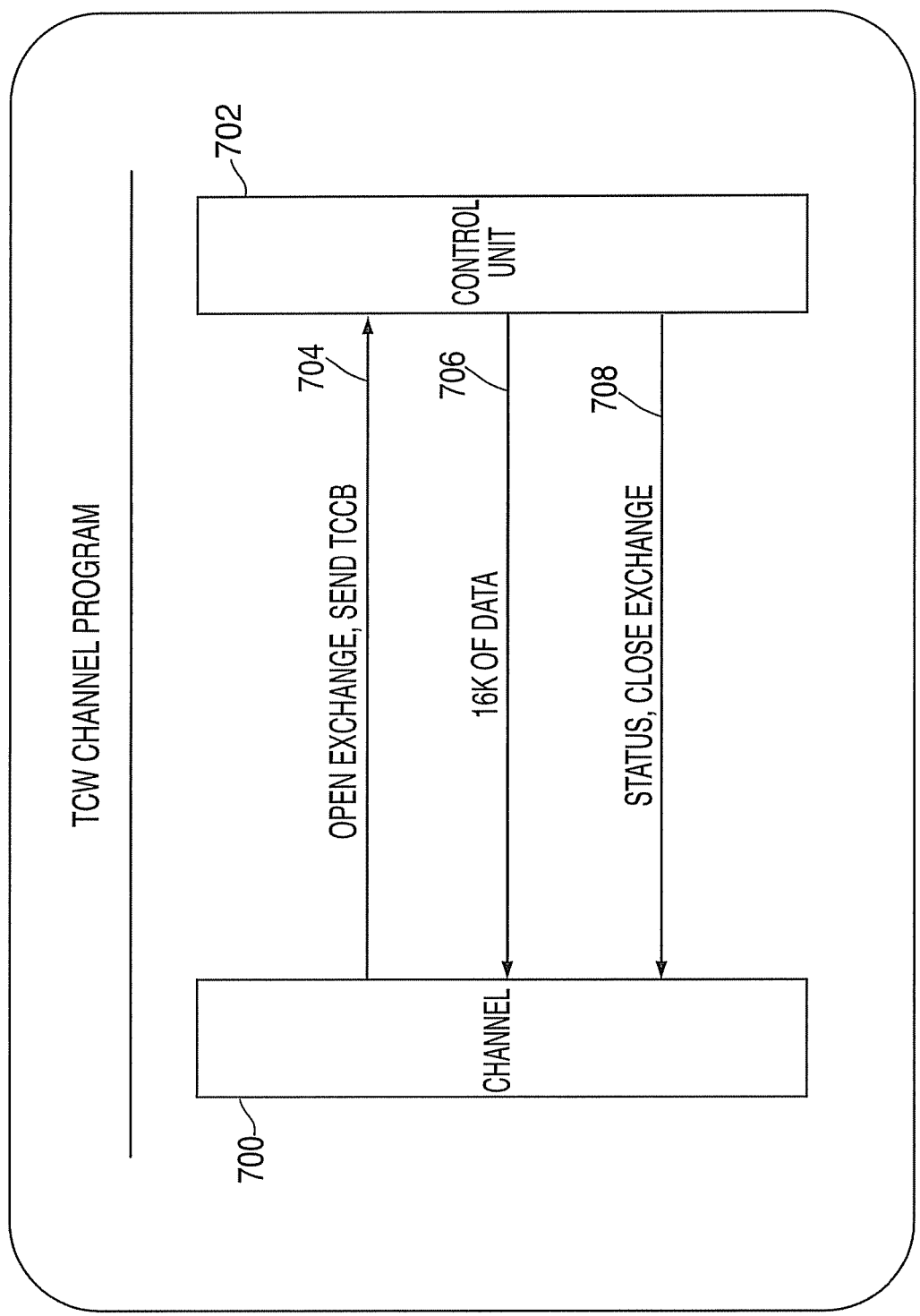
FIG. 7 depicts one embodiment of a link protocol used to communicate between a channel and control unit to process the four read commands of a transport control word channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four read commands in DCWs, as described above. In response to receiving the TCCB 704, the control unit 702 executes the commands and sends, in a single sequence, the 16 k of data 706 to the channel 700. Additionally, the control unit 702 provides status to the channel 700 and closes the exchange 708. Thus, the TCW channel program requires much less communications to transfer the same amount of data as the CCW channel program of FIG. 6.

Figure 8:
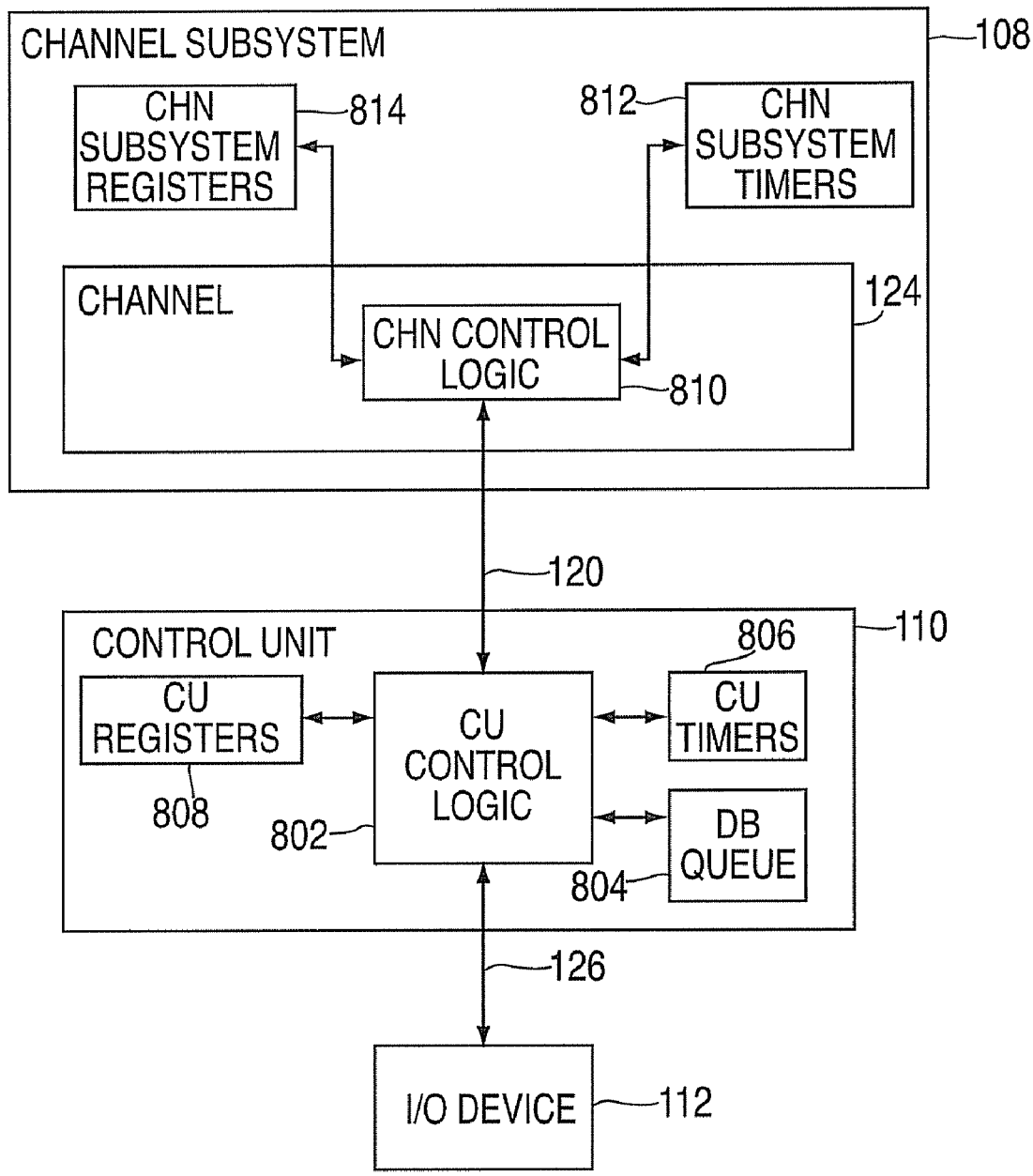
FIG. 8 depicts one embodiment of a control unit and a channel, in accordance with an aspect of the present invention.

Turning now to FIG. 8, one embodiment of the control unit 110 and the channel 124 of FIG. 1 that support TCW channel program execution are depicted in greater detail. The control unit 110 includes CU control logic 802 to parse and process command messages containing a TCCB, such as the TCCB 704 of FIG. 7, received from the channel 124 via the connection 120. The CU control logic 802 can extract DCWs and control data from the TCCB received at the control unit 110 to control a device, for instance, I/O device 112 via connection 126. The CU control logic 802 sends device commands and data to the I/O device 112, as well as receives status information and other feedback from the I/O device 112. For example, the I/O device 112 may be busy because of a previous reservation request targeting I/O device 112. To manage potential device reservation contention issues that can arise when the control unit 110 receives multiple requests to access the same I/O device 112, the CU control logic 802 keeps track of and stores device busy messages and associated data in a device busy queue 804. In an exemplary embodiment, an OS 103 of FIG. 1 reserves I/O device 112 to keep other OSs 103 from accessing the I/O device 112 while the reservation is active. Although device reservation is not required for all I/O operations, device reservation can be used to support operations that necessitate exclusive access for a fixed duration of time, e.g., disk formatting.

The CU control logic 802 can access and control other elements within the control unit 110, such as CU timers 806 and CU registers 808. The CU timers 806 may include multiple timer functions to track how much time a sequence of I/O operations takes to complete. The CU timers 806 may further include one or more countdown timers to monitor and abort I/O operations and commands that do not complete within a predetermined period. The CU registers 808 can include fixed values that provide configuration and status information, as well as dynamic status information that is updated as commands are executed by the CU control logic 802. The control unit 110 may further include other buffer or memory elements (not depicted) to store multiple messages or status information associated with communications between the channel 124 and the I/O device 112. The CU registers 808 may include a maximum control unit exchange parameter that defines the maximum number of open control unit exchanges that the control unit 110 supports.

The channel 124 in the channel subsystem 108 includes multiple elements to support communication with the control unit 110. For example, the channel 124 may include CHN control logic 810 that interfaces with CHN subsystem timers 812 and CHN subsystem registers 814. In an exemplary embodiment, the CHN control logic 810 controls communication between the channel subsystem 108 and the control unit 110. The CHN control logic 810 may directly interface to the CU control logic 802 via the connection 120 to send commands and receive responses, such as transport command and response IUs. Alternatively, messaging interfaces and/or buffers (not depicted) can be placed between the CHN control logic 810 and the CU control logic 802. The CHN subsystem timers 812 may include multiple timer functions to track how much time a sequence of I/O operations takes to complete, in addition to the time tracked by the control unit 110. The CHN subsystem timers 812 may further include one or more countdown timers to monitor and abort command sequences that do not complete within a predetermined period. The CHN subsystem registers 814 can include fixed values that provide configuration and status information, as well as dynamic status information, updated as commands are transported and responses are received.

One example of a response message 900, e.g., a transport response IU, communicated from the control unit 110 to the channel 124 upon completion of a TCW channel program is depicted in FIG. 9. The response message 900 provides status information to the channel 124 and may indicate that an open exchange between the channel 124 and the control unit 110 should be closed. The status information provided when a TCW channel program (e.g., as depicted in FIGS. 5 and 7) is executed includes additional information beyond the status information sent upon completion of a CCW channel program (e.g., as depicted in FIGS. 3 and 6). The response message 900 includes a status section 902 and an extended status section 904. When the channel 124 receives the response message 900, it stores parts of status section 902 in the subchannel for the device the TCW was operating with and the extended status section 904 in a memory location defined by the TCW associated with the TCW channel program that triggered the response message 900. For example, a TCW can designate a section of main memory 102 of FIG. 1 for storage of the extended status section 904.

The status section 902 of the response message 900 can include multiple fields, such as an address header 906, status flags one 908, maximum control unit exchange parameter 910, response flags 912, response code 914, residual count 916, response length 918, reserved location 920, SPC-4 sense type 922, status flags two 924, status flags three 926, device status 928, and a longitudinal redundancy check (LRC) word 930. Each field in the status section 902 is assigned to a particular byte address to support parsing of the response message 900. Although one arrangement of fields within the status section 902 is depicted in FIG. 9, it will be understood that the order of fields can be rearranged to alternate ordering within the scope of the disclosure. Moreover, fields in the response message 900 can be omitted or combined within the scope of the invention, e.g., combining status flags two 924 and three 926 into a single field. SPC-4 is further described in "SCSI Primary Commands—4 (SPC-4)", Project T10/1731-D, Rev 11, INCITS (May 2007), which is hereby incorporated herein by reference in its entirety.

In an exemplary embodiment, the address header 906 is set to the same value as the value received by the control unit 110 in the TCCB that initiated the TCW channel program. Although the address header 906 is not required, including the address header 906 may support testing to trace command and response messages on an I/O device 112 while multiple I/O devices 112 are being accessed.

Status flags one 908 may indicate information such as the success status of an I/O operation. Multiple bits within the status flags one 908 can provide additional status information.

The maximum control unit exchange parameter 910 identifies the maximum number of exchanges that the control unit 110 allows the channel 124 to open to it. A value of zero may inform the channel 124 that the control unit 110 is not altering the current value that the channel 124 is using. In an exemplary embodiment, the channel 124 establishes a default value for the maximum number of open exchanges, e.g. 64, which the control unit 110 can modify via the maximum control unit exchange parameter 910. The value of the maximum control unit exchange parameter 910 sent in the response message 900 may be the actual value desired or a seed value for an equation. For example, the value in the maximum control unit exchange parameter 910 can be incremented and/or multiplied by the channel 124 to determine the actual maximum number of open exchanges, e.g. a value of "1" interpreted as "32" by the channel 124.

Using a default value for the maximum number of open exchanges gives each control unit 110 and channel 124 a common starting point that can be modified as determined by the control unit 110. In one embodiment, the channel 124 checks the maximum control unit exchange parameter 910 received in the response message 900 from the control unit 110 to determine if the maximum control unit exchange parameter 910 is lower than the default value or a previously received value. If the new number is smaller than the current number of open exchanges, the channel 124 does not drive new I/O commands to the control unit 110 until the current number of exchanges used is less than the new limit.

In an exemplary embodiment, the response flags field 912 uses the standard definition as defined in FCP and can be set to default value, e.g., two. The response code 914 may be equivalent to a Small Computer System Interface (SCSI) status field and can be set to a default value, such as zero. The residual count 916 for read or write commands indicates the difference between how many bytes were commanded to be read or written versus the number of bytes that actually were read or written. The response length 918 is an additional count of bytes of information in the response message 900 after the reserved location 920. The response length 918 supports variable sized response messages 900. The SPC-4 sense type 922 can be assigned to a particular value based upon message type, e.g., a transport response IU=7F hexadecimal. In one embodiment, the status flags two 924 is set to a value of 80 hexadecimal to indicate that the I/O operation completed, with a valid value of the residual count 916. Status flags three 926 is set to a value of one when the I/O operation completed, indicating that extended status 904 is included as part of the response message 900. The device status 928 relays status information generated by the I/O device 112. The LRC word 930 is a check word that covers the other fields in the status section 902 of the response message 900 to verify the integrity of the status section 902. The LRC word 930 can be generated through applying an exclusive-or operation to an initial seed value with each field included in the LRC calculation in succession.

The extended status section 904 provides information to the channel subsystem 108 and the OS 103 associated with operating the control unit 110 in a transport mode capable of running a TCW channel program. The extended status section 904 may support configurable definitions with different type status definitions for each type. In an exemplary embodiment, the extended status section 904 includes a transport status header (TSH) 932, a transport status area (TSA) 934, and an LRC word 936 of the TSH 932 and the TSA 934. The TSH 932 may include extended status length 940, extended status flags 942, a DCW offset 944, a DCW residual count 946, and a reserved location 948. The TSH 932 is common for the different formats, with the each format defined by a type code in the extended status flags 942. The TSA 934 may include a total device time parameter 950, defer time parameter 952, queue time parameter 954, device busy time parameter 956, device active only time parameter 958, and appended device sense data 960. Each of these fields is described in greater detail in turn.

The extended status length 940 is the size of the extended status section 904. In an exemplary embodiment, the extended status flags 942 has the following definition:
  Bit 0—The DCW offset 944 is valid.
  Bit 1—The DCW residual count 946 is valid.
  Bit 2—This bit set to a one informs the OS 103 of FIG. 1 in a definitive manner when the control unit 110 had to access slow media for data, e.g., a cache miss.
  Bit 3—Time parameters 950-958 are valid. The type code set to a one and this bit set to a one indicates that all or the time parameters 950-958 are valid.
  Bit 4—Reserved.
  Bits 5 to 7—These three bits are the type code that defines the format of the TSA 934 of the extended status section 904. The names of the encodes are:
    0. Reserved.
    1. I/O Status. The extended status section 904 contains valid ending status for the transport-mode I/O operation.
    2. I/O Exception. The extended status section 904 contains information regarding termination of the transport-mode I/O operation due to an exception condition.
    3. Interrogate Status. The extended status section 904 contains status for an interrogate operation.
    4. to 7. Reserved.

The DCW offset 944 indicates an offset in the TCCB of a failed DCW. Similarly, the DCW residual count 946 indicates the residual byte count of a failed DCW (i.e., where execution of the DCWs was interrupted).

In an exemplary embodiment, the TSA 934 definition when the type code of ES flags 942 indicates a type of I/O Status includes time parameters 950-958, as well as optionally appended device sense data 960. The time parameters 950-958 represent time values and can be scaled to any time units, such as microseconds. The CU timers 806 of FIG. 8 are used to calculate the time parameters 950-958, and the CU registers 808 can also be employed to capture values of the CU timers 806 on a triggering event.

The total device time parameter 950 is the elapsed time from when the control unit 110 received the transport command IU until it sent the transport response IU (i.e., response message 900) for the I/O operation. The defer time parameter 952 indicates control unit defer time. This is the time accumulated by the control unit 110 working with the I/O device 112 when no communication with the channel 124 is performed. On CCW channel programs, such as that depicted in FIG. 3, the control unit 302 disconnects from the channel 300 during this time.

The queue time parameter 954 is the time that an I/O operation is queued at the control unit 110, but does not include queue time for device busy time where the I/O device 112 is reserved by another channel 124 under control of a different OS 103 on the same system or on another system. The device busy time parameter 956 is the time that a transport command IU is queued at the control unit 110 waiting on a device busy caused by the I/O device 112 being reserved by another channel 124 under control of a different OS 103 on the same system or on another system.

The device active only time parameter 958 is the elapsed time between a channel end (CE) and a device end (DE) at the control unit 110, when the control unit 110 holds the CE until DE is available. The CE may indicate that the portion of an I/O operation involving a transfer of data or control information between the channel 124 and the control unit 110 has been completed. The DE may indicate that the device portion of an I/O operation is completed. The appended device sense data 960 is supplemental status that the control unit 110 provides conditionally in response to an active unit check (UC) bit in the device status 928.

The LRC word 936 is a longitudinal redundancy check word of the TSH 932 and the TSA 934, calculated in a similar fashion as the LRC word 930 in the status 902 section of the response message 900. The LRC word 936 can be calculated on a variable number of words, depending upon the number of words included in the appended device sense data 960.

Figure 10:
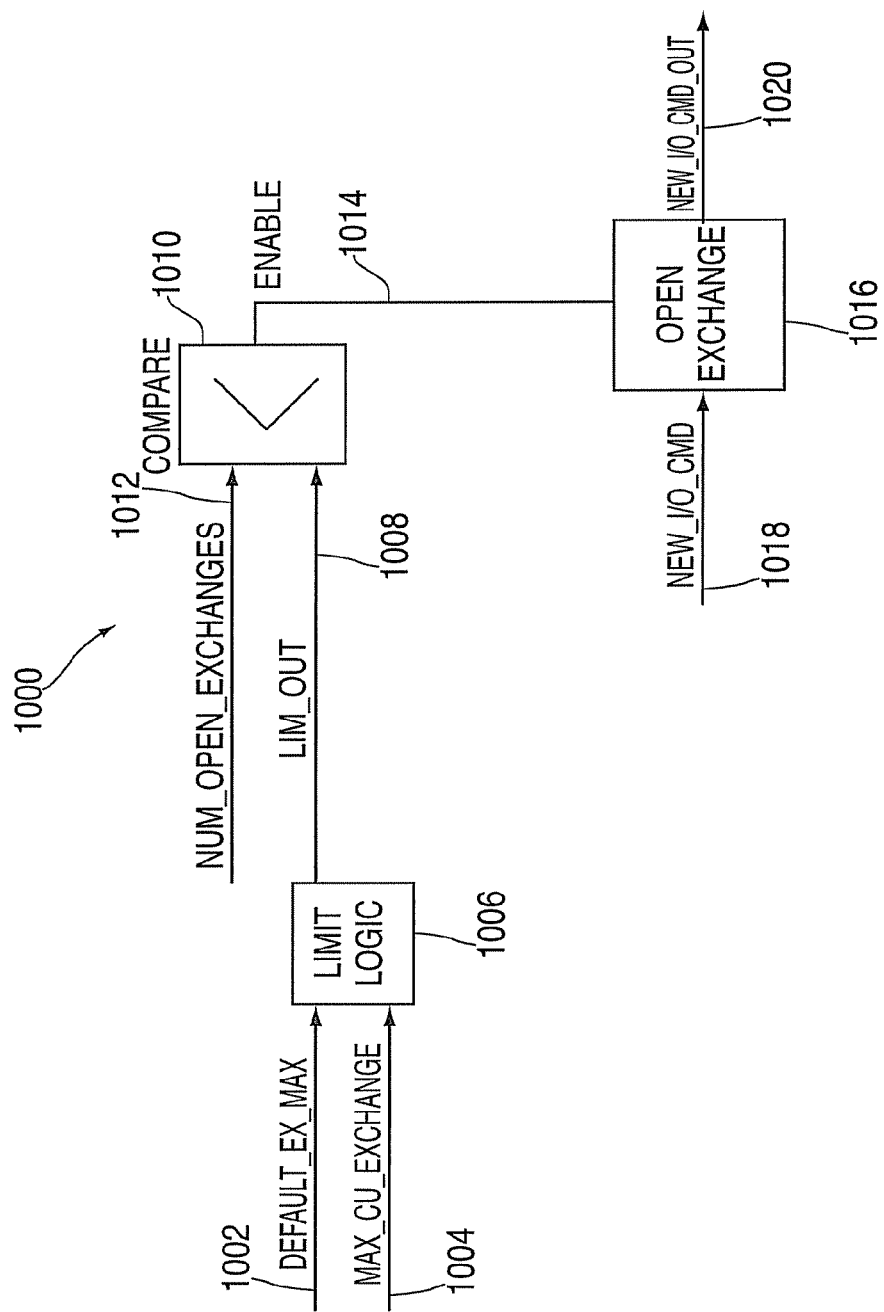
FIG. 10 depicts one embodiment of open exchange limiting logic to limit the number of open exchanges in an I/O processing system.

FIG. 10 depicts open exchange limiting logic 1000, which may be implemented as part of the channel subsystem 108 of FIG. 8. In an exemplary embodiment, the functionality depicted in open exchange limiting logic 1000 is repeated for each control unit 110 with which the channel subsystem 108 communicates. A default exchange maximum (DEFAULT_EX_MAX) 1002 and a received maximum control unit exchange value (MAX_CU_EXCHANGE) 1004 are input into limit logic 1006. The DEFAULT_EX_MAX 1002 is a default value representing the maximum number of open exchanges to a control unit. The DEFAULT_EX_MAX 1002 may be a field or a full register value in the CHN subsystem registers 814, establishing a default value for all control units 110 connected to the channel subsystem 108. For example, the DEFAULT_EX_MAX 1002 may default to a value of 64, indicating that the maximum number of open exchanges to each control unit 110 is 64 until control units 110 provide actual values as MAX_CU_EXCHANGE 1004. The MAX_CU_EXCHANGE 1004 is a local copy of the maximum control unit exchange parameter 910 as extracted from the status section 902 of the response message 900 of FIG. 9.

In an exemplary embodiment, the limit logic 1006 examines the DEFAULT_EX_MAX 1002 and the MAX_CU_EXCHANGE 1004 to produce a limit value output (LIM_OUT) 1008. The limit logic 1006 initially outputs the LIM_OUT 1008 as function of the DEFAULT_EX_MAX 1002, either as a direct or scaled value of the DEFAULT_EX_MAX 1002, until a value for the MAX_CU_EXCHANGE 1004 is received. When the MAX_CU_EXCHANGE 1004 is received with a value of zero, the limit logic 1006 does not modify LIM_OUT 1008, retaining the same output value. However, if the MAX_CU_EXCHANGE 1004 is updated in response to receiving a new value of the maximum control unit exchange parameter 910 of FIG. 9, then LIM_OUT 1008 is updated correspondingly. The limit logic 1006 may also perform scaling of the DEFAULT_EX_MAX 1002 and/or the MAX_CU_EXCHANGE 1004 prior to outputting the LIM_OUT 1008. For example, the MAX_CU_EXCHANGE 1004 can be incremented by one and multiplied by sixteen ((MAX_CU_EXCHANGE+1)*16) to produce LIM_OUT 1008. Such a scaled approach consumes fewer bits during transmission (e.g., maximum control unit exchange parameter 910), but results in a wider range of limit values for the LIM_OUT 1008.

The LIM_OUT 1008 is input into a compare block 1010 to perform a comparison relative to the number of exchanges presently open (NUM_OPEN_EXCHANGES) 1012. The NUM_OPEN_EXCHANGES 1012 may be a field or dedicated register in the CHN subsystem registers 814 indicating the number of exchanges currently open between the channel subsystem 108 and an associated control unit 110 which provided the maximum control unit exchange parameter 910. The compare block 1010 drives an enable signal 1014 that enables or disables an open exchange function 1016. The open exchange function 1016 determines whether a new exchange can be opened in response to a new I/O command (NEW_I/O_CMD) 1018, such as a TCCB in a transport command IU. If the open exchange function 1016 is enabled by the enable signal 1014, then the NEW_I/O_CMD 1018 is output on a new exchange as a new I/O command output (NEW_I/O_CMD_OUT) 1020, resulting in a TCCB being sent to the associated control unit 110 on the newly opened exchange. Thus, the compare block 1010 establishes a maximum number of open exchanges by preventing the opening of a new exchange in response to the number of open exchanges being less than the currently established limit (NUM_OPEN_EXCHANGES 1012<LIM_OUT 1008). When the compare block 1010 results in a "false" condition, the enable signal 1014 is disabled, preventing the opening of additional exchanges at the open exchange function 1016 until the NUM_OPEN_EXCHANGES 1012 is reduced to a value less than LIM_OUT 1008.

Figure 11:
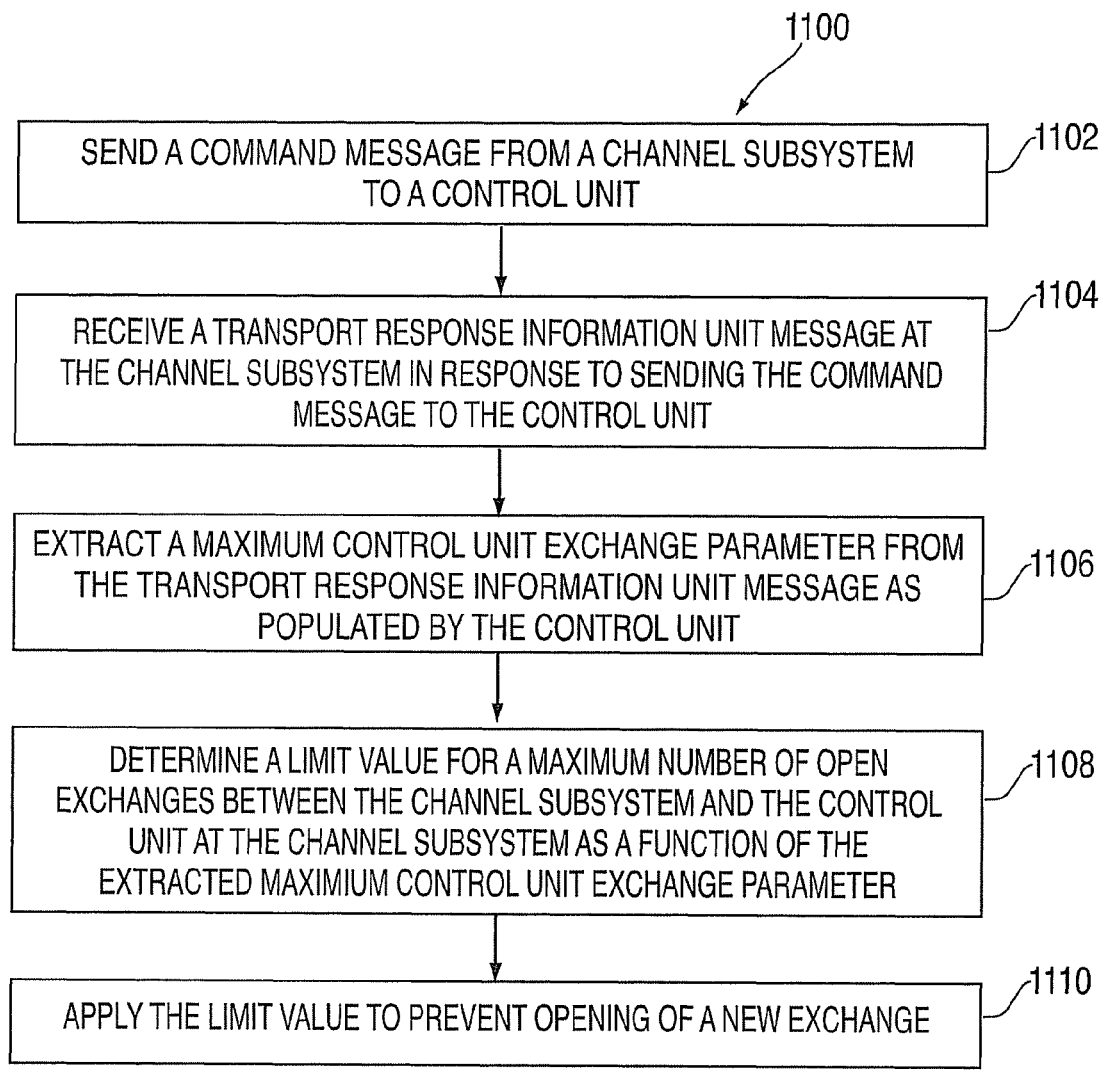
FIG. 11 depicts one embodiment of a process for limiting the number of open exchanges at a channel subsystem of an I/O processing system using data from a control unit.

Turning now to FIG. 11, a process 1100 for limiting the number of open exchanges at the channel subsystem 108 of the I/O processing system 100 using data from the control unit 110 will now be described in accordance with exemplary embodiments, and in reference to the I/O processing system 100 of FIG. 1. At block 1102, the channel subsystem 108 sends a command message to the control unit 110. The command message may be a transport command IU, including a TCCB with multiple DCWs as part of a TCW channel program. The control unit 110 receives the command message, parses it, and initiates I/O operations as commanded in the DCWs to the I/O device 112. Upon termination of the TCW channel program on the control unit 110, the control unit 110 reports status information to the channel subsystem 108 in a transport response IU message (e.g., response message 900 of FIG. 9, including a status section 902). The transport response IU message includes maximum control unit exchange parameter 910 of FIG. 9. In an alternate exemplary embodiment, the control unit 110 outputs the transport response IU message when the command message was a message other than a transport command IU including a TCCB with multiple DCWs as part of a TCW channel program.

At block 1104, the channel subsystem 108 receives the transport response IU message in response to sending the command message to the control unit 110. Communication between the channel subsystem 108 and the control unit 110 may be managed by the CU control logic 802 and the CHN control logic 810 of FIG. 8 for a specific channel 124 of the channel subsystem 108.

At block 1106, the channel subsystem 108 extracts the maximum control unit exchange parameter 910 from the transport response information unit message as populated by the control unit 110. For example, the maximum control unit exchange parameter 910 may be extracted from the status section 902 of the response message 900 of FIG. 9, where the response message 900 depicts one embodiment of the transport response IU message.

At block 1108, the channel subsystem 108 determines a limit value for a maximum number of open exchanges between the channel subsystem 108 and the control unit 110 at the channel subsystem 108 as a function of the extracted maximum control unit exchange parameter 910. The limit value is initially set to a default value, such as sixty-four, and then modified in response to receiving and extracting the maximum control unit exchange parameter 910. For example, the limit value may be LIM_OUT 1008 of FIG. 10 as determined by the limit logic 1006, with a default value of DEFAULT_EX_MAX 1002 and MAX_CU_EXCHANGE 1004 set equal to the extracted maximum control unit exchange parameter 910. The function used to calculate the limit value may be a combination of multiple mathematical operations, such as incrementing by an offset value and multiplying by a scalar value (e.g., add one, then multiply by sixteen).

At block 1110, the channel subsystem 108 applies the limit value to prevent a new exchange from opening. Through comparing the number of exchanges currently open at the channel subsystem 108 (e.g., NUM_OPEN_EXCHANGES 1012 of FIG. 10) to the limit value (e.g., LIM_OUT 1008 of FIG. 10), the channel subsystem 108 can determine whether a new exchange can be opened to send a new I/O command to the control unit 110, or if the channel subsystem 108 must wait for one or more open exchanges to close. The determination may be performed using the open exchange function 1016 in conjunction with the enable signal 1014 as output from the compare block 1010 of FIG. 10. When the open exchange function 1016 is disabled, transmission of a new I/O command (e.g., transport command IU with a TCCB) on a new exchange is blocked until an exchange is available to open.

Technical effects of exemplary embodiments include limiting the number of open exchanges at a channel subsystem of an I/O processing system using data from a control unit. The limit is provided in a response message from the control unit. The channel subsystem receiving the limit can prevent attempts at the channel subsystem from exceeding the capability of the control unit. Advantages include limiting the number of open exchanges without interrupting the execution of a TCW channel program on a control unit. Applying the limit at the channel subsystem may prevent the control unit from experiencing error conditions associated with receiving requests to open a greater number of exchanges than the control unit can handle. Avoiding such error conditions can improve communication and processing throughput for the I/O processing system, as new I/O commands are held off until exchanges are available to communicate the new I/O commands. Further advantages include support for various levels of complexity at different control units rather than applying a static limit for all control units.

Figure 12:
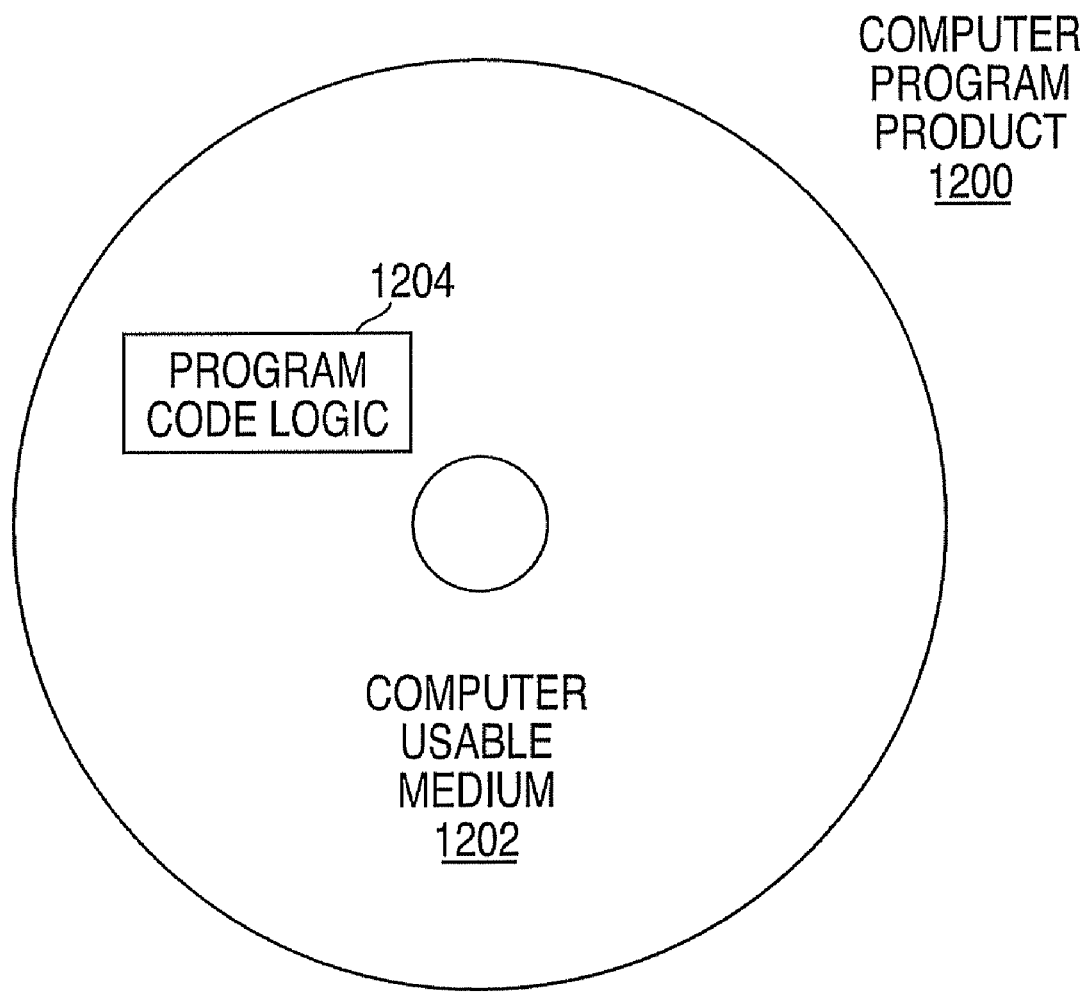
FIG. 12 depicts one embodiment of a computer program product incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1200 as depicted in FIG. 12 on a computer usable medium 1202 with computer program code logic 1204 containing instructions embodied in tangible media as an article of manufacture. Exemplary articles of manufacture for computer usable medium 1202 may include floppy diskettes, CD-ROMs, hard drives, universal serial bus (USB) flash drives, or any other computer-readable storage medium, wherein, when the computer program code logic 1204 is loaded into and executed by a computer, the computer becomes an apparatus for practicing the invention. Embodiments include computer program code logic 1204, for example, whether stored in a storage medium, loaded into and/or executed by a computer, or transmitted over some transmission medium, such as over electrical wiring or cabling, through fiber optics, or via electromagnetic radiation, wherein, when the computer program code logic 1204 is loaded into and executed by a computer, the computer becomes an apparatus for practicing the invention. When implemented on a general-purpose microprocessor, the computer program code logic 1204 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for limiting a number of open exchanges at a channel subsystem of an input/output (I/O) processing system using data from a control unit, the computer program product comprising:
a tangible storage medium readable by a processing circuit and storing instructions for execution by the processing circuit for performing a method comprising:
sending a command message to the control unit;
receiving a transport response information unit message at the channel subsystem in response to sending the command message to the control unit;
extracting a maximum control unit exchange parameter from the transport response information unit message as populated by the control unit;
determining a limit value for a maximum number of open exchanges between the channel subsystem and the control unit at the channel subsystem as a function of the extracted maximum control unit exchange parameter; and applying the limit value to prevent opening of a new exchange.

2. The computer program product of claim 1 wherein the method further comprises setting the limit value equal to a default value until the maximum control unit exchange parameter is extracted from the transport response information unit message.

3. The computer program product of claim 2 wherein the default value is sixty-four.

4. The computer program product of claim 1 wherein the limit value is calculated as the extracted maximum control unit exchange parameter incremented by one and multiplied by sixteen.

5. The computer program product of claim 1 wherein the limit value is unmodified in response to the extracted maximum control unit exchange parameter with a value of zero.

6. The computer program product of claim 1 wherein applying the limit value to prevent the opening of the new exchange blocks a new I/O command from being output on the new exchange in response to a current number of open exchanges being greater than or equal to the limit value.

7. The computer program product of claim 1 wherein the maximum control unit exchange parameter is extracted from a status section of the transport response information unit message.

8. The computer program product of claim 1 wherein the command message is a transport command information unit message, including a transport command control block (TCCB) as part of a transport control word (TCW) channel program.

9. An apparatus for limiting a number of open exchanges at a channel subsystem of an input/output (I/O) processing system, the apparatus comprising:
a channel subsystem configured to communicate with a control unit, the channel subsystem configured to perform a method comprising:
sending a command message to the control unit;
receiving a transport response information unit message at the channel subsystem in response to sending the command message to the control unit;
extracting a maximum control unit exchange parameter from the transport response information unit message as populated by the control unit;
determining a limit value for a maximum number of open exchanges between the channel subsystem and the control unit at the channel subsystem as a function of the extracted maximum control unit exchange parameter; and
applying the limit value to prevent opening of a new exchange.

10. The apparatus of claim 9 wherein the channel subsystem configured to perform the method further comprises setting the limit value equal to a default value until the maximum control unit exchange parameter is extracted from the transport response information unit message.

11. The apparatus of claim 10 wherein the default value is sixty-four.

12. The apparatus of claim 9 wherein the limit value is calculated as the extracted maximum control unit exchange parameter incremented by one and multiplied by sixteen.

13. The apparatus of claim 9 wherein the limit value is unmodified in response to the extracted maximum control unit exchange parameter with a value of zero.

14. The apparatus of claim 9 wherein applying the limit value to prevent the opening of the new exchange blocks a new I/O command from being output on the new exchange in response to a current number of open exchanges being greater than or equal to the limit value.

15. The apparatus of claim 9 wherein the maximum control unit exchange parameter is extracted from a status section of the transport response information unit message.

16. The apparatus of claim 9 wherein the command message is a transport command information unit message, including a transport command control block (TCCB) as part of a transport control word (TCW) channel program.

17. A method for limiting a number of open exchanges at a channel subsystem of an input/output (I/O) processing system using data from a control unit, the method comprising:
sending a command message to the control unit;
receiving a transport response information unit message at the channel subsystem in response to sending the command message to the control unit;
extracting a maximum control unit exchange parameter from the transport response information unit message as populated by the control unit;
determining a limit value for a maximum number of open exchanges between the channel subsystem and the control unit at the channel subsystem as a function of the extracted maximum control unit exchange parameter; and
applying the limit value to prevent opening of a new exchange.

18. The method of claim 17 further comprising:
setting the limit value equal to a default value until the maximum control unit exchange parameter is extracted from the transport response information unit message.

19. The method of claim 17 wherein the limit value is calculated as the extracted maximum control unit exchange parameter incremented by one and multiplied by sixteen.

20. The method of claim 17 wherein the limit value is unmodified in response to the extracted maximum control unit exchange parameter with a value of zero.

21. The method of claim 17 wherein applying the limit value to prevent the opening of the new exchange blocks a new I/O command from being output on the new exchange in response to a current number of open exchanges being greater than or equal to the limit value.

22. The method of claim 17 wherein the maximum control unit exchange parameter is extracted from a status section of the transport response information unit message.

23. The method of claim 17 wherein the command message is a transport command information unit message, including a transport command control block (TCCB) as part of a transport control word (TCW) channel program.

24. A computer program product for limiting a number of open exchanges at a channel subsystem of an input/output (I/O) processing system using data from a control unit, the computer program product comprising:
a tangible storage medium readable by a processing circuit and storing instructions for execution by the processing circuit for performing a method comprising:
sending a transport command information unit message to the control unit including a transport command control block (TCCB) as part of a transport control word (TCW) channel program;
setting a limit value equal to a default value until a transport response information unit message is received from the control unit, wherein the limit value establishes a maximum number of open exchanges between the channel subsystem and the control unit at the channel subsystem;

receiving the transport response information unit message at the channel subsystem in response to sending the transport command information unit message to the control unit;

extracting a maximum control unit exchange parameter from the transport response information unit message as populated by the control unit;

determining the limit value as a function of the extracted maximum control unit exchange parameter, wherein the limit value is unmodified in response to the extracted maximum control unit exchange parameter with a value of zero; and applying the limit value to prevent opening of a new exchange to block a new I/O command from being output on the new exchange in response to a current number of open exchanges being greater than or equal to the limit value.

25. An apparatus for limiting a number of open exchanges at a channel subsystem of an input/output (I/O) processing system, the apparatus comprising:

a channel subsystem configured to communicate with a control unit, the channel subsystem configured to perform a method comprising:

sending a transport command information unit message to the control unit including a transport command control block (TCCB) as part of a transport control word (TCW) channel program;

setting a limit value equal to a default value until a transport response information unit message is received from the control unit, wherein the limit value establishes a maximum number of open exchanges between the channel subsystem and the control unit at the channel subsystem;

receiving the transport response information unit message at the channel subsystem in response to sending the transport command information unit message to the control unit;

extracting a maximum control unit exchange parameter from the transport response information unit message as populated by the control unit;

determining the limit value as a function of the extracted maximum control unit exchange parameter, wherein the limit value is unmodified in response to the extracted maximum control unit exchange parameter with a value of zero; and applying the limit value to prevent opening of a new exchange to block a new I/O command from being output on the new exchange in response to a current number of open exchanges being greater than or equal to the limit value.

\* \* \* \* \*